No. 833,295. PATENTED OCT. 16, 1906.
W. E. BOCK.
MACHINE FOR MAKING HOLLOW GLASS ARTICLES.
APPLICATION FILED JAN. 18, 1904.

4 SHEETS—SHEET 1.

WITNESSES

INVENTOR
WILLIAM · EMIL · BOCK ·
BY
ATTY.

No. 833,295. PATENTED OCT. 16, 1906.
W. E. BOCK.
MACHINE FOR MAKING HOLLOW GLASS ARTICLES.
APPLICATION FILED JAN. 18, 1904.

4 SHEETS—SHEET 2

WITNESSES

INVENTOR
WILLIAM EMIL BOCK
BY
ATTY.

No. 833,295. PATENTED OCT. 16, 1906.
W. E. BOCK.
MACHINE FOR MAKING HOLLOW GLASS ARTICLES.
APPLICATION FILED JAN. 18, 1904.

4 SHEETS—SHEET 4.

WITNESSES
Geo. M. Gowen
Jno. P. Barry

INVENTOR
WILLIAM EMIL BOCK
BY James Whittemore
ATTY.

UNITED STATES PATENT OFFICE.

WILLIAM EMIL BOCK, OF TOLEDO, OHIO, ASSIGNOR TO THE TOLEDO GLASS COMPANY, OF TOLEDO, OHIO, A CORPORATION OF OHIO.

MACHINE FOR MAKING HOLLOW GLASS ARTICLES.

No. 833,295.  Specification of Letters Patent.  Patented Oct. 16, 1906.

Application filed January 18, 1904. Serial No. 189,572.

*To all whom it may concern:*

Be it known that I, WILLIAM EMIL BOCK, a citizen of the United States, residing at Toledo, in the county of Lucas and State of Ohio, have invented certain new and useful Improvements in Machines for Making Hollow Glass Articles, of which the following is a specification, reference being had therein to the accompanying drawings.

The invention relates to machines for making hollow glass articles; and it consists in a machine in which the glass may be gathered in the usual way and delivered to a blank-mold and in which the blank is formed by compressed air applied to the inner end thereof and then is formed into a hollow blank by blowing it in a blank-mold, the blank being then transferred to a blowing-mold, where it is blown to its complete form.

The invention further consists in the construction, arrangement, and combination of the various parts, as more fully hereinafter described, and particularly pointed out in the claims.

Figure 1:
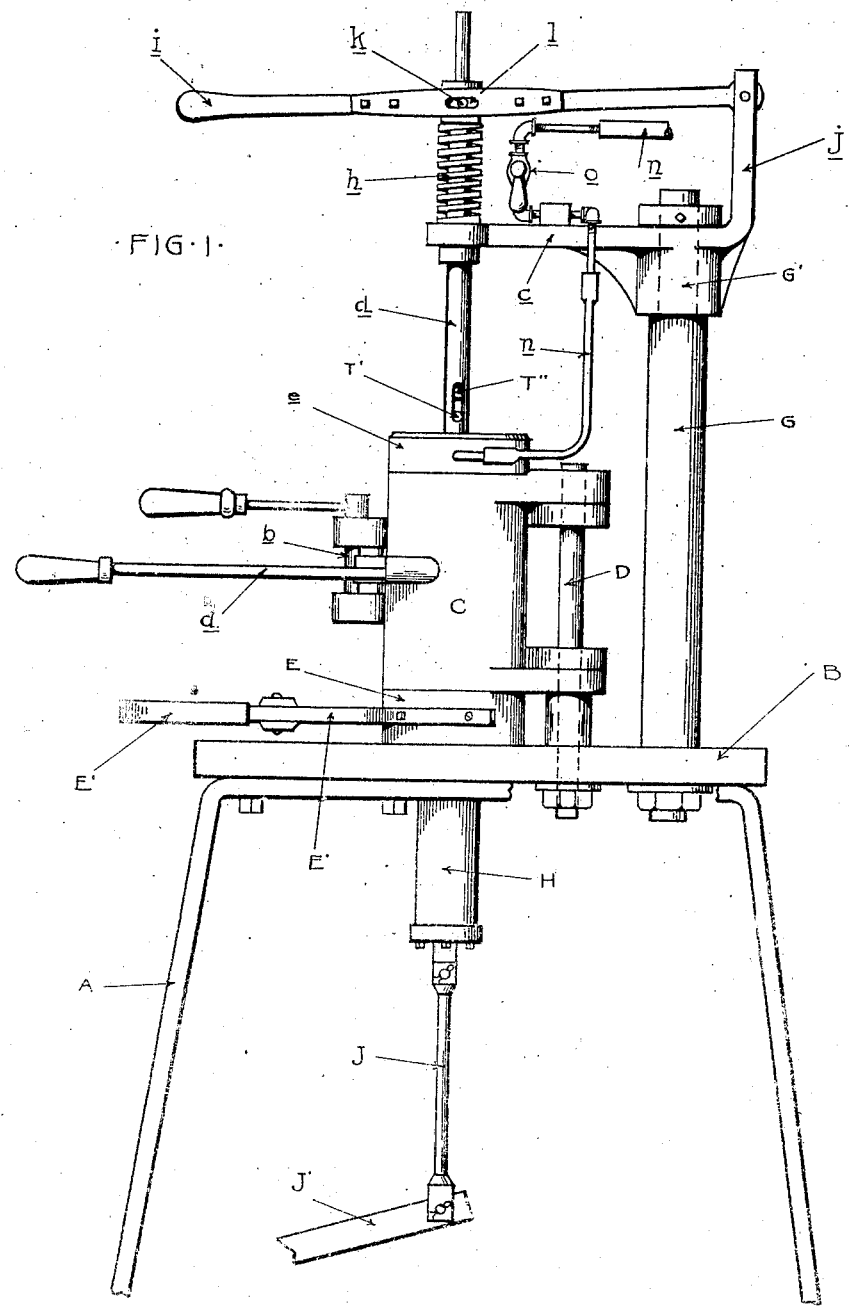
Figure 2:
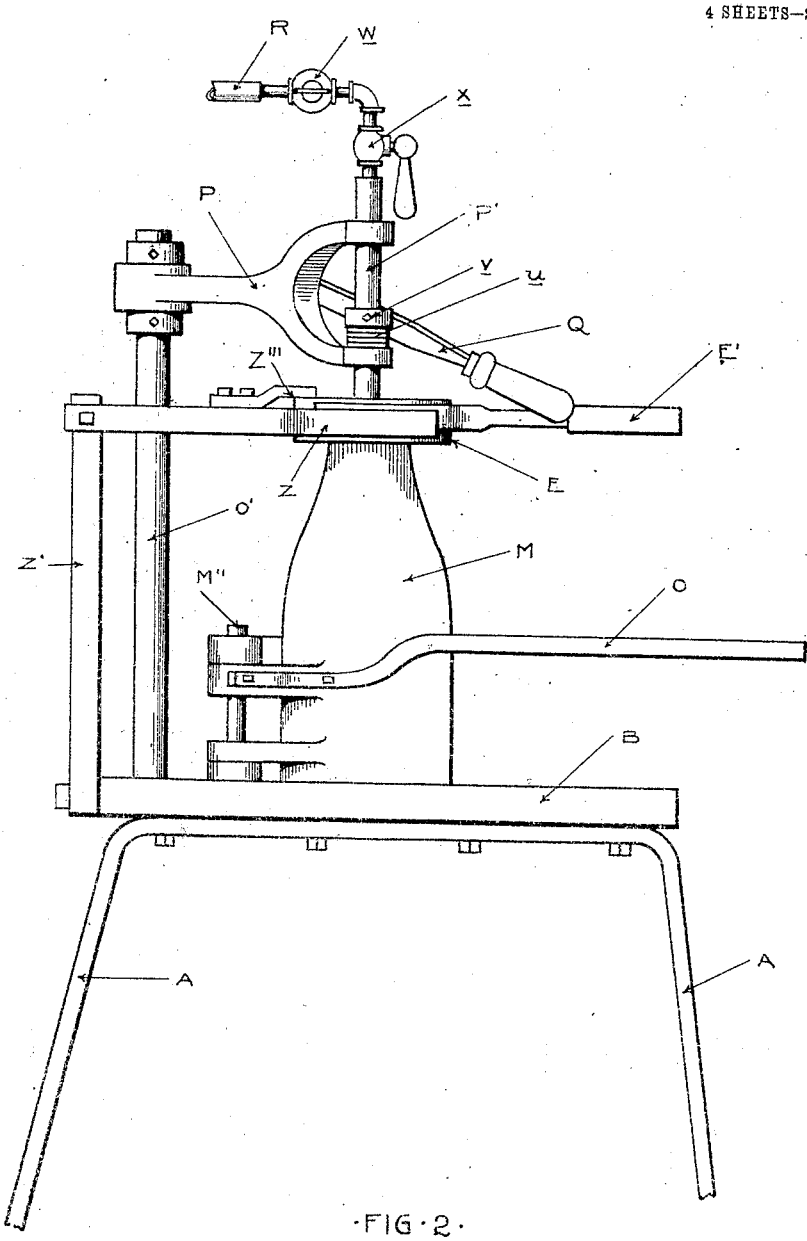
Figure 3:
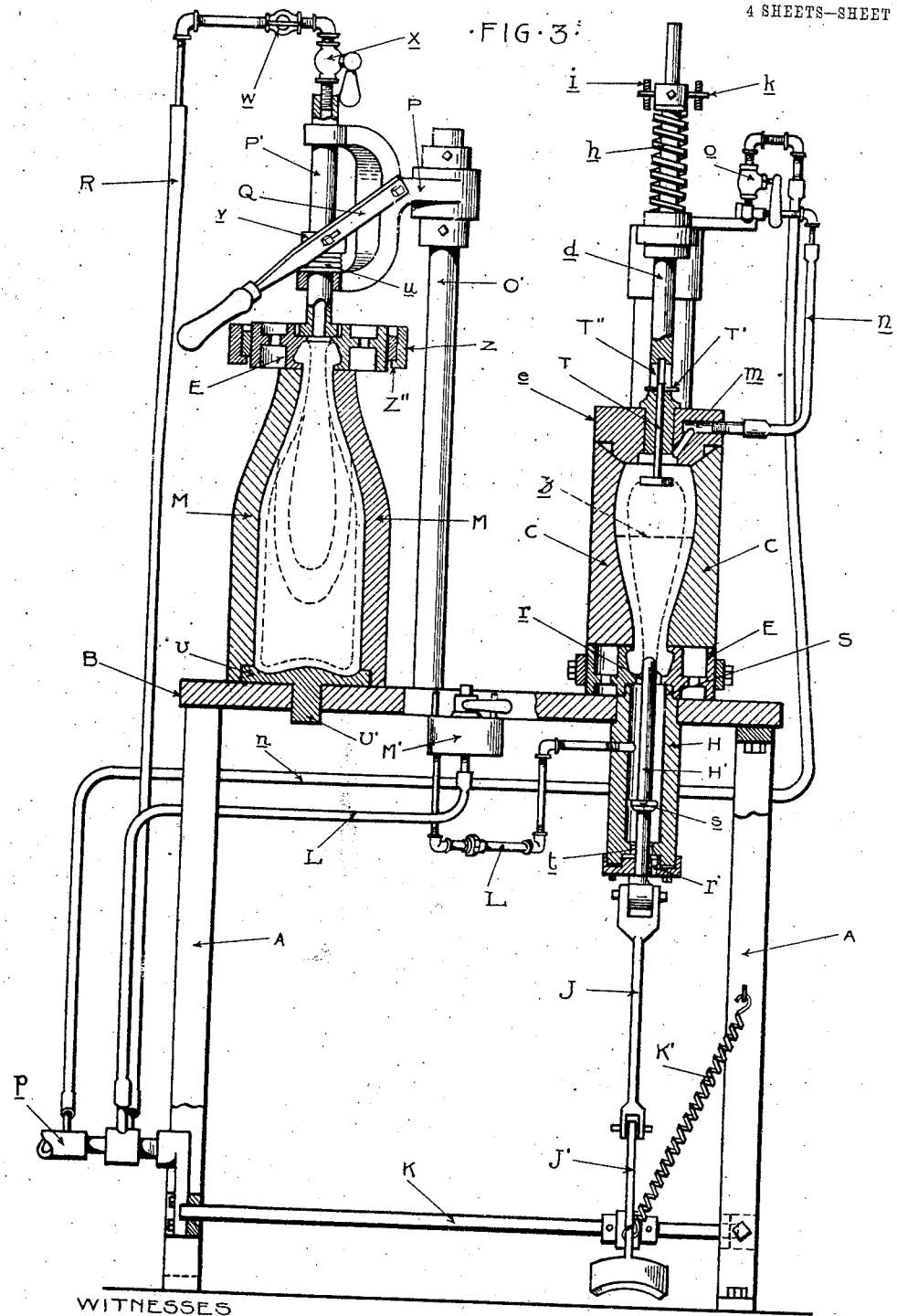
Figure 4:
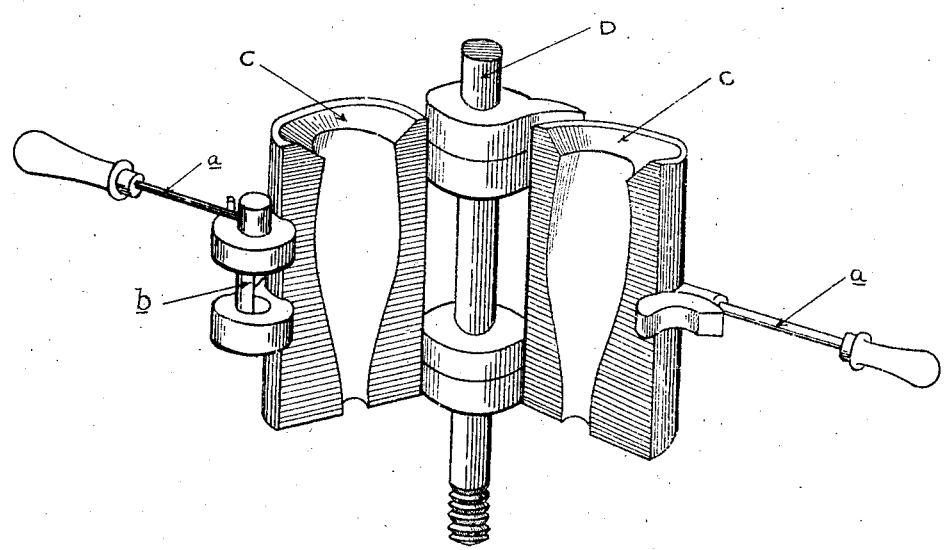

Figure 1 is a side elevation of the machine. Fig. 2 is a similar elevation looking from the opposite side. Fig. 3 is a vertical central section through the machine and through the blank and blowing molds thereof, showing some of the parts in elevation to more clearly illustrate the same. Fig. 4 is a perspective view of the body-blank mold in its open position; and Fig. 5 is a perspective view of the neck-mold or the lower portion of the blank-mold, showing it also in the open position.

A is a suitable frame upon which the operating parts are supported, preferably having a table B at the top. The blank-mold I form, preferably, of the body portion C, (shown in Fig. 4,) made in two sections, hinged together on the pivot-pin D in the usual way of making molds. The sections are provided with the operating-handles $a$ for opening and closing them and also with a locking device $b$ for clamping them tightly together in their closed position, these parts being of any desired construction.

Figure 5:
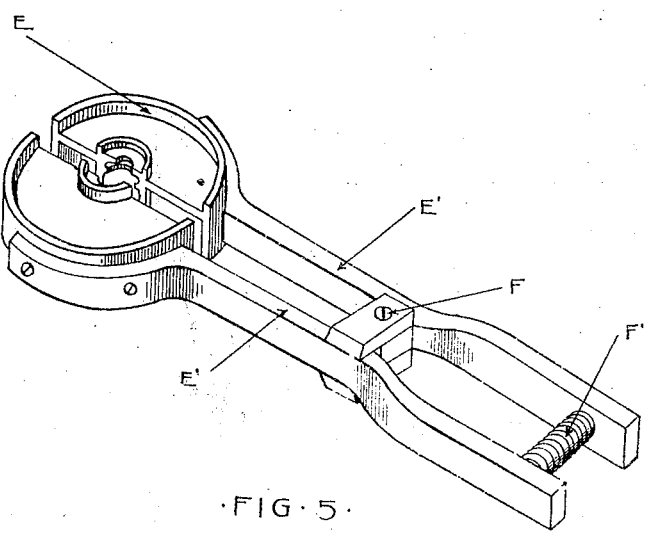

Associated with the body-blank portion C and forming a part of the blank-mold is the neck portion or neck-ring E, which I preferably construct as shown in Fig. 5, the sections having the levers E' connected thereto, these levers being pivoted together at F and normally held in the closed position by the tension of the interposed spring F' at the free ends of the levers.

G is a standard beside the blank-mold, having a head G' pivotally secured to the upper portion thereof. This head extends laterally to one side in the bracket $c$ and in the outer end of the bracket is supported the vertically-reciprocating plunger $d$, which carries the cap or head $e$ for the blank-molds. This head is held normally in the position above the top of the blank-mold by the spring $h$ encircling the rod and bearing at the lower end against the bracket $c$ and at its upper end against the lever $i$, supported in the bracket $j$ on the head G'. This lever is forked to embrace the plunger-rod $d$ and is connected therewith by means of pins $k$, entering slots $l$ in the lever.

The head $e$ is shaped to fit the upper end of the body-blank mold C. It is provided with an air-passage $m$, which is connected with an air-pipe $n$ for supplying compressed air to the interior of the blank-mold, as will be hereinafter described. This pipe $n$ is controlled by a suitable shut-off valve $o$ and leads from the valve to a supply-pipe $p$, to which compressed air may be supplied from any suitable source.

Below the blank-mold and table B is a cylindrical casing H, in which is a pin or stem H', projecting slightly above the casing and into the neck-mold, as shown at the right hand of Fig. 3. The neck-mold is apertured to allow of this projection of the pin thereon, and the aperture is slightly larger than the pin, so as to leave a narrow annular passageway $r$ between the pin and the sides of the aperture through the neck-ring. On the stem near the lower end is a valve $s$, which is adapted to close the aperture $t$ through the head of the cylindrical casing H. The pin or stem H' extends from the casing H and is connected to the connecting-rod J, which in turn is pivotally connected to the lever J', fulcrumed on the rod K near the base of the machine. This lever is acted upon by a spring K', so as to normally hold the pin or stem H' in its bottom position and withdrawn from within the neck-mold or neck-ring.

L is an air-supply pipe leading into the chamber within the casing H, and this leads to the valve M' of any suitable construction for controlling the admission of the compressed air therefrom. The pipe L after connecting to the valve M' leads likewise to the main supply-pipe p.

On the table B and adjacent to the blank-mold is the blowing-mold M, made in sections in the usual manner, each hinged together by means of the hinge-pin M'', which extends upward from the table B. These sections are provided with the usual handles O for opening and closing.

O' is a standard beside the blowing-mold, having a bifurcated bracket P secured to the upper end. In the outer end of this bracket is slidingly secured the pipe P', which is normally held in its upper position by means of a spring u between the lower bifurcation of the bracket and the collar v on the pipe P'.

Q is a lever connected to the collar v and pivoted in the bracket, adapted to reciprocate the pipe P'. To the upper end of the pipe P' is attached a supply-pipe R, having a shut-off valve w and a controlling-valve x thereon. The pipe R likewise leads to the main air-supply pipe p.

The parts being thus constructed, their operation is as follows: The operator first puts the neck-ring E over the nipple S, which is formed by a slight extension of the casing H above the table, and the spring F' will tightly hold the two sections of the neck-ring together. The body-blank mold C is then closed and fits tightly upon the upper surface of the neck-ring, as shown in Fig. 3. Glass being gathered in any desired manner is brought to the blank-mold. The head e being turned to one side, the operator drops the desired quantity of glass into the blank-mold, which will partially fill it—say to the line z, Fig. 3. As soon as the gathering-tool is out of the way the operator grasps the lever i and turns it so that the head e is above the blank-mold and then lowers it upon the blank-mold and at once opens the valve o, which lets compressed air in through the port or passage m and bears upon the upper surface of the glass, thus pressing the glass down in the blank-mold and causing the lower end of it to conform to the neck portion thereof and in this case where a bottle is to be shaped giving the exterior formation to the neck. The operator having applied his foot to the lever J' and raised the pin H' into the neck-mold, as shown in Fig. 3, before the glass is dropped into the blank-mold, when the glass is pressed down to the lower end of the blank-mold the pin will form an initial cavity or blow-opening or indentation in the lower end of the blank. Any air which may be in the mold below the glass will find a ready escape through the narrow passage t and r' between the pin and the sides of the opening through the neck-ring. The blank will thus be formed with the neck part shaped and an indentation therein, and a solid portion of lesser length considerably than the bottle and of lesser length than the blank that is to be formed and from which the bottle is to be blown. In order to make the blowing-blank from the initial blank thus made, it is desirable or necessary to make a hollow blank from this initial blank, and to do this the operator takes his foot off the lever J', which allows the pin H' to lower and causes the valve s to seat tightly, closing the chamber in the casing H. Having shut off the valve o, he opens the valve M', which admits air into the chamber within the casing H, which air will pass upward into the indentation or initial blow-opening in the blank and will expand the blank into the shape shown in dotted lines in Fig. 3. In order to apprise the operator that the blank has been blown to full size, I preferably place a small pin T, passing axially through the lower end of the plunger-rod d and having the crossing-pin T' projecting out through the slots T'' in the side of the plunger-rod d. As soon as the operator sees this pin T' rise he will know that the blank is expanded to the size of the blank-mold and the blank is completed. The operator then closes the valve M', releases his hold of the lever i, which permits the head e to rise, opens the blank-mold C, and grasping the levers E' of the neck-mold he quickly lifts the same, together with the blank, and inverts it. The operator then slides the neck-mold containing the blank into the open forward end of the yoke Z, which is supported on the standard Z' and has the guide-flanges Z'' on its inner face, as clearly shown in Fig. 3. The blowing-mold sections M are then closed about the blank and are held tightly shut, and then the operator grasping the lever Q lowers the pipe P' upon the upper face of the neck-mold, the opening in the pipe being opposite the opening in the neck-mold and the opening in the blank. This downward movement of the pipe P' not only makes a tight joint between the pipe and the neck-mold, but also moves the neck-mold tightly down against the upper end of the blow-mold, which is permitted by the spring in the support for the yoke, and this makes a tight joint between the parts during the blowing operation. The blank is allowed to remain suspended in the blow-mold for a moment or until the blank has elongated, preferably, to touch the bottom of the blow-mold, and then the operator opens the valve x (the valve w being normally open) and the air is admitted into the blank to blow the bottle to complete form, as shown in Fig. 3 in dotted lines.

Z''' is a lug or vertical guide secured to the rear side of the yoke, beneath which the neck-ring is slid when it is put into the yoke, acting to assist in holding the neck-ring in proper position.

It is obvious that instead of putting his foot on the lever J at the time or before the glass is dropped in the operator may first drop in the glass and allow the pressure to be applied to the upper end thereof and then depress the lever J' and lift the pin or stem H' into the glass and form the initial blow-opening after the blank has been forced down to the lower end of the blank-mold, this being merely a matter that is optional with the operator as to the time of operation.

I have shown the bottom of the blowing-blank as formed by a circular bottom plate U, supported on a pin U', secured in an aperture in the table. Any of the usual and ordinary forms of blowing-molds and bottoms therefor may be employed, as the broader features of my invention relate to the formation of the blank.

I believe I am the first to make a blank of lesser length than the blank in a mold by blowing the blank into shape and then making a hollow blank by counter-blowing from the opposite end thereof, and I find by experience that such a blank is very quickly and cheaply made, and the bottles can be manufactured by such a machine cheaply and of good quality, only requiring a gatherer and a single man to operate the machine.

What I claim as my invention is—

1. The combination of a blank-mold, means for admitting air under pressure at both ends of the mold while said mold is in one position, one air connection being constructed and adapted to blow the blank into a mold in substantially solid form, and the other air connection being adapted to counter-blow the blank in a hollow form.

2. The combination with a table, of a movable plunger in the top thereof, a mold-support around the plunger, a neck-mold and a blank-mold adapted to be supported above the plunger, a movable cap for the blank-mold having an air-supply connection thereto, and an air-supply connection leading into the mold within the mold-support, for the purpose described.

In testimony whereof I affix my signature in presence of two witnesses.

WILLIAM EMIL BOCK.

Witnesses:
E. H. CLOSE,
WM. S. WALBRIDGE.